United States Patent [19]

Reese et al.

[11] Patent Number: 5,089,210

[45] Date of Patent: Feb. 18, 1992

[54] MOX FUEL ASSEMBLY DESIGN

[75] Inventors: Anthony P. Reese, San Jose; Russell L. Crowther, Jr. deceased, late of San Jose, all of Calif., by Cosette M. Crowther, Russell L. Crowther III, Eric J. Crowther, heirs

[73] Assignee: General Electric Company, San Jose, Calif.

[21] Appl. No.: 492,514

[22] Filed: Mar. 12, 1990

[51] Int. Cl.$^5$ .............................................. G21C 7/30
[52] U.S. Cl. ..................... 376/212; 376/419; 376/428; 376/435; 376/349; 376/267
[58] Field of Search ............... 376/212, 435, 422, 419, 376/428, 435, 349, 917, 267; 976/DIG. 59, DIG. 63, DIG. 64

[56] References Cited

U.S. PATENT DOCUMENTS

| | | | |
|---|---|---|---|
| 3,105,036 | 9/1963 | Puechl | 376/267 |
| 3,382,153 | 5/1968 | Bigge et al. | 376/267 |
| 3,745,069 | 7/1973 | Sofer et al. | 376/267 |
| 3,799,839 | 3/1974 | Fischer et al. | 376/419 |
| 3,844,886 | 10/1974 | Crowther | 376/267 |
| 4,285,769 | 8/1981 | Specker et al. | 376/267 |
| 4,587,090 | 5/1986 | Mochida et al. | 376/428 |
| 4,629,599 | 12/1986 | Crowther et al. | 376/212 |
| 4,914,678 | 4/1990 | Koyama et al. | 376/267 |
| 5,017,332 | 5/1991 | Dix et al. | 376/370 |

OTHER PUBLICATIONS

Plutonium Recycle Studies for the Sena Pwr Reactor by J. Debrue, Nuclear Applications and Technology, vol. 9 (Oct. 1970), pp. (516–527).

Primary Examiner—Donald P. Walsh
Assistant Examiner—Meena Chelliah
Attorney, Agent, or Firm—Robert R. Schroeder

[57] ABSTRACT

The present invention relates to nuclear reactors and more specifically to a fuel bundle arrangement for a boiling water nuclear reactor in which so-called mixed oxide fuels including plutonium and uranium are utilized in a nuclear fuel bundle together with a burnable absorber such as gadolinium to optimize the reaction of a nuclear fuel bundle.

9 Claims, 6 Drawing Sheets

MOX FUEL ASSEMBLY DESIGN

The present invention relates to nuclear reactors and more specifically to a fuel bundle arrangement for a boiling water nuclear reactor in which so-called mixed oxide fuels including plutonium and uranium are utilized in a nuclear fuel bundle together with a burnable absorber such as gadolinium to optimize the reaction of a nuclear fuel bundle.

BACKGROUND OF THE INVENTION

I. Field of the Invention

In a boiling water nuclear reactor, a fissile fuel atom, such as U235, PU239, or PU241 absorbs a neutron in its nucleus and undergoes nuclear disintegration. This produces on the average two fissile fragments of lower atomic weight with great kinetic energy and several neutrons, these neutrons also being at high energy.

In the boiling water nuclear reactor, the nuclear fuel is in the form of fuel rods, each of which comprises a plurality of scintered pellets contained within an elongate sealed cladding tube or "fuel rod." Groups of such fuel rods are supported between upper and lower tie plates to form separately replaceable fuel assembles or bundles. A sufficient number of such fuel assemblies are arranged in a matrix, approximating a right circular cylinder, to form the nuclear reactor core which is capable of self-sustained fission reaction. The kinetic energy of the fission products is dissipated as heat in the fuel rods. Energy is also deposited in the fuel structure and moderator by the neutrons, gamma rays and other radiation resulting from the fission process. The core is submerged in coolant which removes the heat. Typically such heat removal occurs by the coolant water boiling into steam. From the steam energy is extracted to perform useful work.

In a boiling water nuclear reactor the coolant also acts as a neutron moderator. This moderator takes the emitted high energy neutrons and slows down the neutrons to render them thermal in character and hence more likely to be absorbed in the fuel continuing the fission reaction.

The commonly used fuel for water cooled and moderated nuclear power reactors comprises uranium dioxide of which from about 0.7 to 5.0% is fissile U235 mixed with fertile U238. During operation of the reactor, some of the fertile U238 is converted to fissile plutonium PU-239 and PU-241. It turns out that the U238 is also fissionable, but only for high energy neutrons. The ratio of fissile materials produced (for example plutonium 239 and plutonium 241) to fissile material destroyed (for example U235, plutonium 239 and plutonium 241) is defined as the "conversion ratio".

Fuel bundles are typically replaced at certain "outages". Typically these outages delineate "cycles". During such outages the reactor is opened and remote lifting equipment removes fuel bundles with spent fuel therein and replaces the fuel bundles with those having fresh fissile materials contained within the fuel rods. At each outage, only a portion of the total fuel bundles are removed. This portion is in the order of 25%.

STATEMENT OF THE PROBLEMS

It is known in the prior art how to reprocess the fuel from used fuel bundles. Typically, plutonium is recovered (for example PU239, PU241). This recovered plutonium is mixed by taking naturally occurring uranium oxides or diffusion plant tails uranium and undergoing a blending process. Typically, the plutoniums and uraniums are converted to oxides. Thereafter, the plutonium oxides and uranium oxides are blended to produce a desired percent by weight of the respective plutonium and uranium compounds. Once the oxides are blended, they are scintered to generate preferably a face centered cubic lattice structure incorporated in fuel pellets. The scintered pellets are placed in sealed zirconium fuel rods. Regarding the matter of blending, these mixed oxide or MOx fuel rods are required to have varying concentrations of Pu. This being the case, it is often necessary to have five or six differing concentrations of plutonium in the varying rods of an individual fuel bundle.

It can be appreciated that this sort of recovery, blending and scintering of the plutonium from spent or used fuel bundles to new fuel bundles is difficult. The radioactive gases and elements of the spent fuel rods must be handled, typically remotely. The plutonium itself is toxic, is an alpha emitter and has long half-lives which complicate the removal process. Simply stated, such plutonium recovery, blending and scintering operations must occur in enclosed environments under special processing conditions. Accordingly, the processing and placement of mixed oxide fuels within nuclear fuel rods differs radically from the use of the more conventional uranium oxide compounds. This being the case, the use of so-called mixed oxide fuels (MOx) occurs in isolated processing plants separate and apart from conventional fuel loadings involving uranium oxides and burnable absorbers such as gadolinium.

If the reactor is to operate at a steady state power level, the fission inducing neutron population must remain constant. That is, each fission reaction must produce a net of 1 neutron which produces a subsequent fission reaction so that the operation is self-sustaining. The operation is characterized by an effective multiplication factor $K_{eff}$ which must be at unity for a steady state operation. It is noted that the effective multiplication factor $K_{eff}$ is the neutron reproduction factor of the nuclear reactor considered as a whole. This is to be distinguished from the local or infinite multiplication factor $K_{inf}$ which defines neutron reproduction of an infinitely large system having throughout the same composition and characteristics as the local region of a reactor core in question.

During operation, the fissile fuel is depleted and indeed some of the fission products are themselves neutron absorbers or "poisons". To offset this, the reactor must normally be provided with an initial excess of nuclear fuel which results in initial excess reactivity. This initial excess reactivity requires a control system to maintain the effective multiplication factor at unity. Such maintenance must occur at the beginning of the fuel cycle in the presence of the excess reactivity. The control system also functions to reduce the effective multiplication factor to below unity so that the reactor can be shut down. The control system typically utilizes neutron absorbing material which serves to control the neutron population by nonfission absorption or the capture of neutrons.

As the described invention herein relates to a sophisticated manner of loading a fuel bundle, it is necessary to understand both the construction of a typical fuel bundle together with its geometry in relating to a so-called control rod as well as adjacent fuel bundles.

Each fuel bundle contains longitudinally extending sealed rods. These rods have the fissile material sealed within them. The material is maintained sealed during the entire life of the fuel bundle. Opening the sealed fuel rods must occur for the processing referred to here.

A group of such fuel rods are typically supported between a lower tie plate at the bottom and an upper tie plate at the top. Arrays of $6 \times 6$, $7 \times 7$, $8 \times 8$ and $9 \times 9$ fuel rods have been utilized. Typically, these arrays define in the indicated number certain so-called "lattice positions" for the fuel rods. It will be understood that portions of these lattice positions can be occupied by other fuel bundle elements. For example, it is common to insert rods for holding water moderator in the center of such fuel bundles to impart to the entirety of the bundle the desired reaction profile for the generation of energy.

Typically, the total number of fuel rods has increased with modern fuel bundle design. Presently, lattice positions $8 \times 8$ and $9 \times 9$ are utilized. Furthermore, in the $9 \times 9$ designs, it is now common to have foreshortened fuel rods in some of the lattice positions. Foreshortening of the fuel rods imparts numerous advantages. An example of such advantages is set forth in the patent application entitled Two Phase Pressure Drop Boiling Water Reactor Assembly Design Ser. No. 176,975 filed Apr. 4, 1988.

Each fuel bundle includes a surrounding channel for confining water flow between and through the tie plates on the axial length of the individual rods. Water moderator flows in the confining channel from the bottom and out of the confining channel at the top. During its passage in an active reactor, steam is produced in mixture with the passing water.

The water moderator is also exterior of the channel. This water typically does not include a high percentage of steam and is contained within what is known as a core bypass zone or region. The core bypass zone or region has water which produces moderation of the fast neutron flux. Fast neutrons rapidly become thermal neutrons capable of initiating continuing nuclear reaction within the core bypass region.

The fuel bundles themselves are typically arrayed for controlling their nuclear reaction in groups of four. Typically, four fuel bundles of square cross section are vertically disposed in side by side relation. Each fuel bundle is spaced apart from the remaining fuel bundle so as to define the interstitial core bypass region. Considering four fuel bundles in side by side relation, the bundles will in the interstices between them define a cruciform shape interstitial area. It is into this cruciform shape interstitial area that a complementary cruciform shaped control rod effects penetration for the parasitic absorption of neutrons and ultimate control of the nuclear reactor.

Modern control rod design includes many groups of four such fuel bundles. It is common for reactor cores to hold up to 800 such discrete fuel bundles. Each group of four such fuel bundles has a control rod penetrating interstitially of the fuel bundle interfaces to affect the absorption of neutrons and the control of the nuclear reactor.

During the lifetime of a fuel bundle, the usual circumstance is that the bundle is not appreciably exposed to the control rods. Consequently, it is the usual case that the thermal neutron flux is relatively high at the fuel bundle corners in comparison to other portions of the fuel bundle.

As the fuel bundles are initially supplied with excess reactivity within their fissile materials it is sometimes necessary to incorporate burnable absorbers. Such burnable absorbers act during the beginning of a fuel cycle to absorb neutrons and prevent the excess reactivity which would otherwise be present from preventing control of the nuclear reaction.

A burnable absorber is a neutron absorber which is converted by neutron absorption into a material of lesser neutron absorbing capability. A well known burnable absorber is gadolinium. The odd isotopes (GD-155 and GD-157) have very high capture cross sections for thermal neutrons.

The burnable absorbers available for use also have an undesirable effect. Specifically, and during the end of the fuel bundle cycle, the residual burnable absorbers decrease the efficiency of the fuel bundle. Its operation would be far better if the burnable absorbers were not present, or at least maintained at an absolute minimum. For example, if gadolinium is used as a burnable absorber, the high cross section isotopes (GD-155 and GD-157) deplete rapidly. Unfortunately, these elements are converted into elements which contain reduced neutron capture cross sections but nevertheless detract measurably from the efficiency of the fuel bundle. For example, in gadolinium, the produced isotopes (GD-154, GD-156 and GD-158) still continue to absorb neutrons and detract from the overall efficiency of the fuel bundle.

As is well known, burnable absorbers, such as gadolinium operate in a self-shielding mode when present at sufficient concentration. That is, upon exposure to neutron flux, the neutron absorptions occurs essentially at the outer surface of the absorbers so that the volume of absorber shrinks radially at a rate that depends upon the concentration of the absorber.

It is additionally known that plutonium, especially fissile PU239 and PU241 have high neutron absorption cross sections relative to uranium. If burnable absorbers such as gadolinium are utilized in combination with fissile plutonium, the gadolinium itself can be shielded from neutrons by the plutonium. Hence to use the control feature of the burnable absorber, much larger concentrations of gadolinium must be utilized where fissile plutonium is present.

There is, related to the present fuel design, a further complication. During operation, the percentage of steam voids within the fuel bundles increases to and towards the top of the reactor. These steam voids lead to decreasing moderation in the top regions of the reactor because water is present in lesser quantities. Thus, there results a power distribution that is skewed towards the lower regions of the fuel bundles forming the reactor core.

It is a known practice to compensate for this by distributing burnable absorber in an axially inhomogeneous manner. A number of fuel rods are provided with burnable absorber having a distribution skewed towards the axial region of hot operating maximum reactivity. A typical configuration is shown in U.S. Pat. No. 3,799,839.

However, the situation is very different in the cold shutdown state. More particularly, in the cold state, the top of an irradiated boiling water reactor core is more reactive than the bottom. This greater reactivity occurs because during normal operation there is greater plutonium production and less U235 destruction in the reactor top. Specifically, a greater population of fast neutrons is present at the top of the reactor. These fast neutrons create a greater conversion ratio and smaller burnup in the fuel rods.

In the cold shutdown condition, the steam voids in the upper part of the core are eliminated because little, if any, steam is present in the moderator. This makes the top of the core more reactive than the bottom in the cold shutdown condition. Typical licensing standards require a 0.38% reactivity shutdown margin ($K_{eff}$ less than 0.9962) with any one control rod stuck out of the core. To provide margin for prediction uncertainties, a design basis of 1% predicted shutdown margin ($K_{eff}$ less than 0.99), to be provided by the control rods and the burnable absorber is typically required and used.

Some reactors have fuel assemblies requiring special designs directed to their so-called "cold reactivity." In such prior art fuel assemblies, the burnable absorber is asymmetrically distributed to allow cold shutdown margins to be met with minimum penalty to operating efficiency. The assembly includes a component of fissile material distributed over the axial extent of the fuel bundle. Mixed within fissile materials a component of neutron absorbing material is added. This neutron absorbing material has an axial distribution characterized by an enhancement in a relatively short axial zone known as the "cold shutdown control zone". This cold shutdown control zone corresponds to at least a portion of the axial region of cold shutdown maximum reactivity. The axial distribution of the component of neutron absorbing material is typically characterized by an additional enhancement in an axial zone known as the "hot operating" control zone. The component neutron absorbing material is conventionally incorporated into at least some of the fuel rods. This enhancement in the cold shutdown zone may be provided at least in part by one or more fuel rods having absorber only in the cold shutdown control zone. This enhancement of the neutron absorbing material in the cold shutdown control zone may be additionally supplemented by reduced fuel enrichment in the cold shutdown control zone.

It should be further understood that it is desired to keep the distribution of gadolinium within a fuel bundle to an absolute minimum. Gadolinium, in addition to absorbing neutrons, reduces the thermal conductivity of the fuel rods and increases fission gas release. Consequently the gadolinium containing rods are frequently the most limiting rods in the fuel assembly. Thus, and because of these limiting rods, the entire fuel bundle must be downrated in power with a corresponding adverse effect on local power distributions. The amount of power downrating that is required depends upon the required gadolinium concentration. This required gadolinium concentration sometimes becomes a serious problem in extended burnup fuel designs and/or high energy cycle designs where increased gadolinium concentrations are required in order to provide adequate cold shutdown margins.

Unfortunately, the relatively dense 9×9 arrays utilized with modern reactors are examples of fuel bundles in which the excess gadolinium can produce problems. The reader must appreciate at this juncture that the above recited background includes a summary of only pertinent operating and shutdown constraints. These pertinent constraints have been summarized so that the following optimized fuel bundle design can be understood.

SUMMARY OF THE INVENTION

A fuel bundle design incorporating oxides of recovered plutonium mixed with uranium (MOx) which can maximize the content of plutonium and minimize the number of different MOx pellet concentration types. In a boiling water nuclear reactor, a fuel bundle is loaded with MOx containing rods at all locations save and except rods at the corners or adjacent to the corners of the bundle. Fuel rods adjacent the corners are provided which preferably do not contain MOx and are instead uranium gadolinium rods. The disclosed uranium gadolinium rods can have their gadolinium asymmetrically loaded so as to impart axially of the fuel bundle the desired cold reactivity shutdown zones. As a consequence, a fuel bundle design is disclosed which can maximize the use of recovered fissile plutonium from previous fuel cycles, minimize the number of different MOx concentration type and enable a reduction of the amount of uranium enrichment required. At the same time, the desired axial shaping for the so-called cold reactivity shutdown zones can be accomplished independent of the MOx rods and more importantly without the mixture of MOx fuels and gadolinium in the same fuel rods. Further, by the placement of the gadolinium uranium rods at the periphery of the bundle near the permanent water gaps with their high thermal neutron flux, the maximum worth of the gadolinium is achieved. Shielding of the gadolinium by the high neutron cross section plutonium is minimized. With the disclosed design, uses of the burnable absorber gadolinium is reduced to a minimum resulting in an improved overall fuel bundle energy output.

Other Objects, Features and Advantages

An object of this invention is to disclose a fuel bundle design in which high levels of plutonium per bundle are utilized.

An advantage of the disclosed design is that it limits the number of discrete plutonium concentrations that are required in each MOx fuel bundle. In the preferred embodiment herein disclosed only three variant concentrations of plutonium are required. This simplifies the blending, mixing and individual fuel rod assembly by limiting the number of discrete plutonium mixtures that are used with the disclosed design.

A further object of this invention is to realize maximum worth of the gadolinium that is utilized with the disclosed fuel bundle. In accordance with this aspect of this invention the gadolinium is placed in corner locations. In these corner locations, the gadolinium sees relatively high neutron flux. At the same time, the gadolinium is not shielded by the relatively high cross section of plutonium used as the fissile material in the bundle.

An advantage of this aspect of the invention is that the gadolinium is disposed where it easily accommodates excess reactivity during the first part of the fuel cycle.

A further advantage of this feature is that when the gadolinium is expended, typically after the first quarter of the end reactor life of the fuel bundle, the remaining gadolinium presents a minimal inefficiency to the fuel bundle.

Yet another advantage of this invention is that the gadolinium placed within fuel rods only at the corner of the fuel bundle can be utilized for the purpose of imparting the cold reactivity shut down zone to the fuel bundle. No varying of the plutonium concentration of the so-called MOx rods is required.

Yet another object of this invention is to disclose a MOx fuel bundle which has a higher reactivity profile during its full life cycle within a reactor. This higher reactivity is imparted to the whole core with the advantage that the higher reactivity helps maintain a fissile reaction.

An advantage of this aspect of the invention is that with the disclosed fuel bundles dispersed throughout the core, the requirement for enrichment in neighboring fuel bundles is reduced.

A further advantage of this disclosed design is that it can be utilized with the dense array of modern fuel bundle designs. For example, two embodiments here utilized are 8×8 and 9×9 fuel rod arrays.

Yet another advantage of this invention is that the design can accommodate partial length rods. Typically, the partial length rods, being placed inside the bundle, are the MOx rods in the disclosed design.

DETAILED DESCRIPTION OF THE DRAWINGS

Other objects, features and advantages of this invention will become more apparent after referring to the following specification and attached drawings in which.

Figure 1:
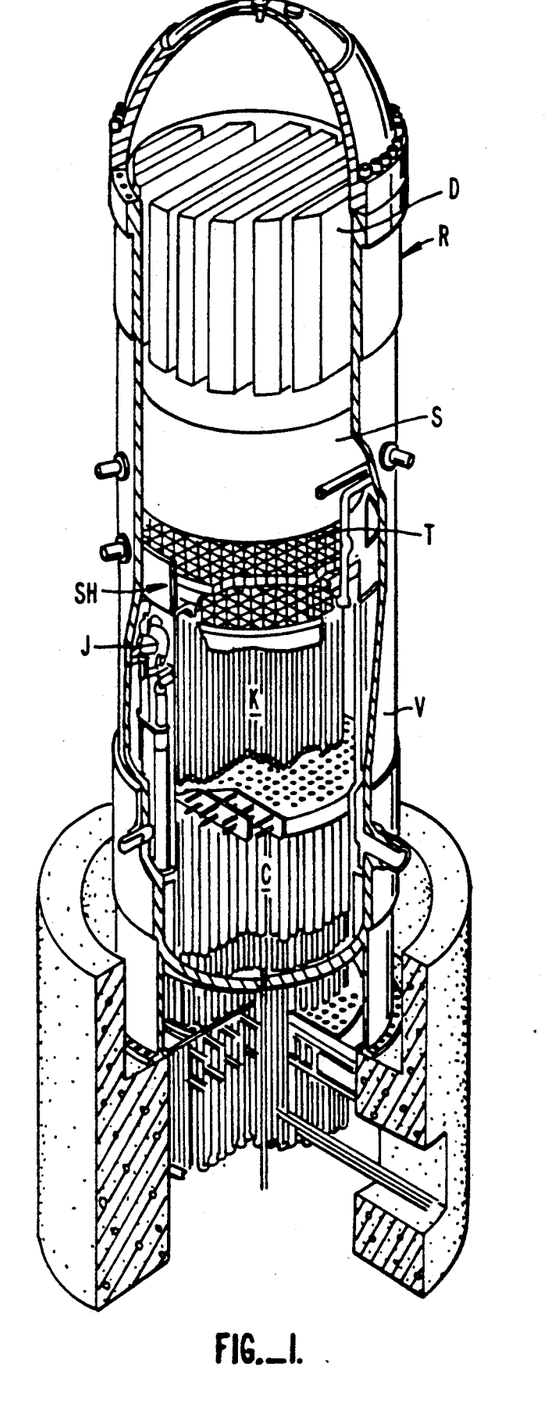
FIG. 1 is a perspective schematic view of a reactor.

Referring to FIG. 1 a reactor R is illustrated having a vessel V, the vessel V having the purpose of containing a nuclear reaction under pressure.

A core K of fuel bundles is illustrated. Fuel bundle K includes an underlying group of control rods C which control rods C force cruciformed shaped control rods into and out of the interstices between adjacent fuel bundles (see FIG. 2).

The reactor R includes a jet pump J for inducing coolant flow. Specifically, jet pump J induces coolant flow down and into the underlying group of control rods C. Fluid flows upwardly through the core K through a top guide T returning to the top of the reactor. Downward flow is induced by the jet pump J over a shroud SH between the side walls of the vessel V and the core K. Thus a downward fluid flow occurs on the outside and an upward fluid flow on the inside.

Produced saturated steam is extracted from the top of the reactor through steam separator S and dryer D. This saturated steam permits the extraction of power through turbines and generators (not shown). Typically the turbines exhaust to a condenser where the spent steam is condensed and made up into reactor feed water for continuous recycling of the coolant.

Figure 2:
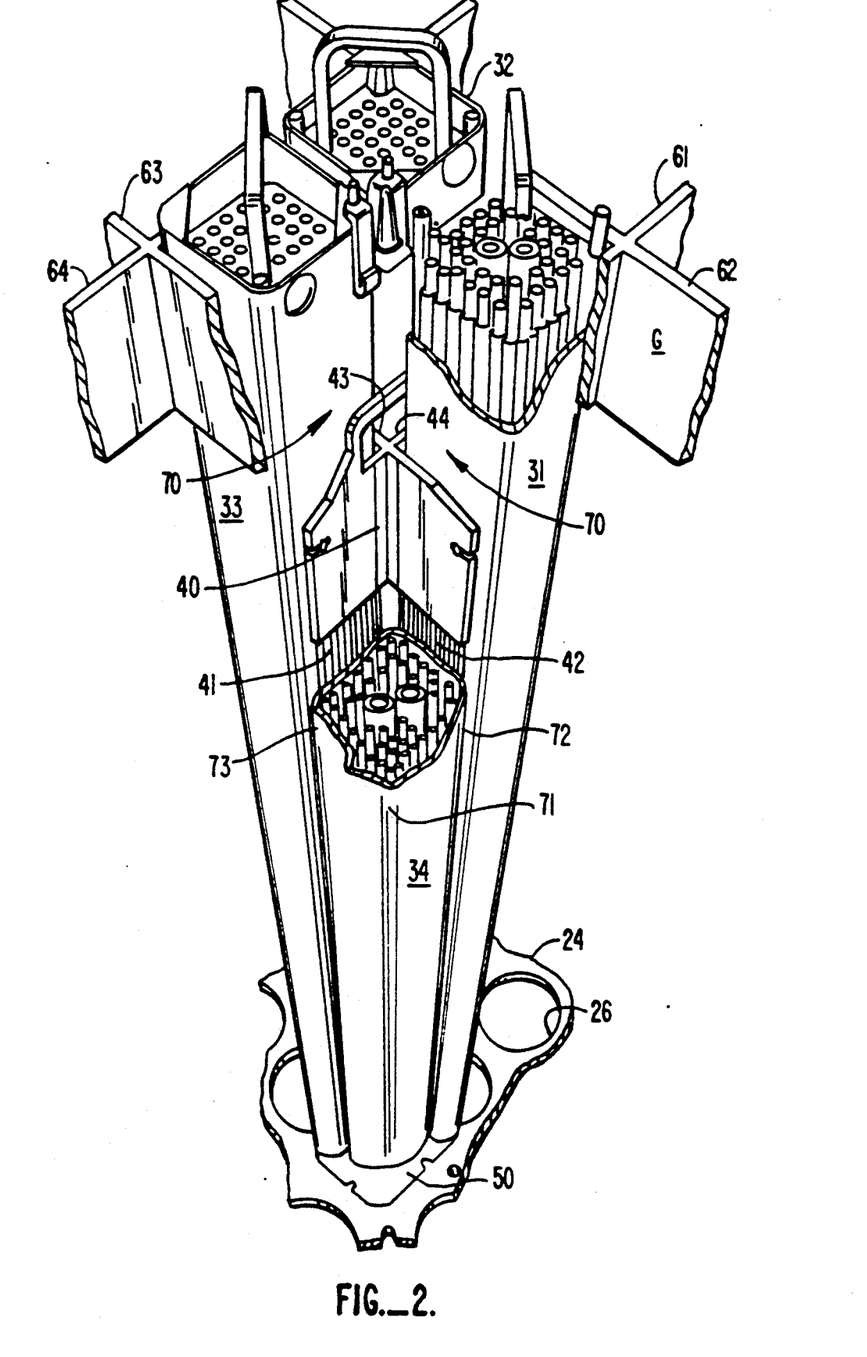
FIG. 2 is a group of four fuel bundles within a reactor core, with one fuel bundle shortened and cutaway so that the penetration of a control rod in the interstitial volume between four fuel bundles can be understood.

Referring to FIG. 2, the reactor at four side by side fuel bundles is illustrated. A lower core plate 24 forms a barrier. This barrier is horizontal and disposed between the group of control rods C (see FIG. 1; not shown FIG. 2) contained below the fuel bundles and the discrete overlying fuel bundles themselves. Barrier 24 enables water to be forced through the bottom of the fuel bundles into and within the channel around the discrete fuel rods.

Figure 3:
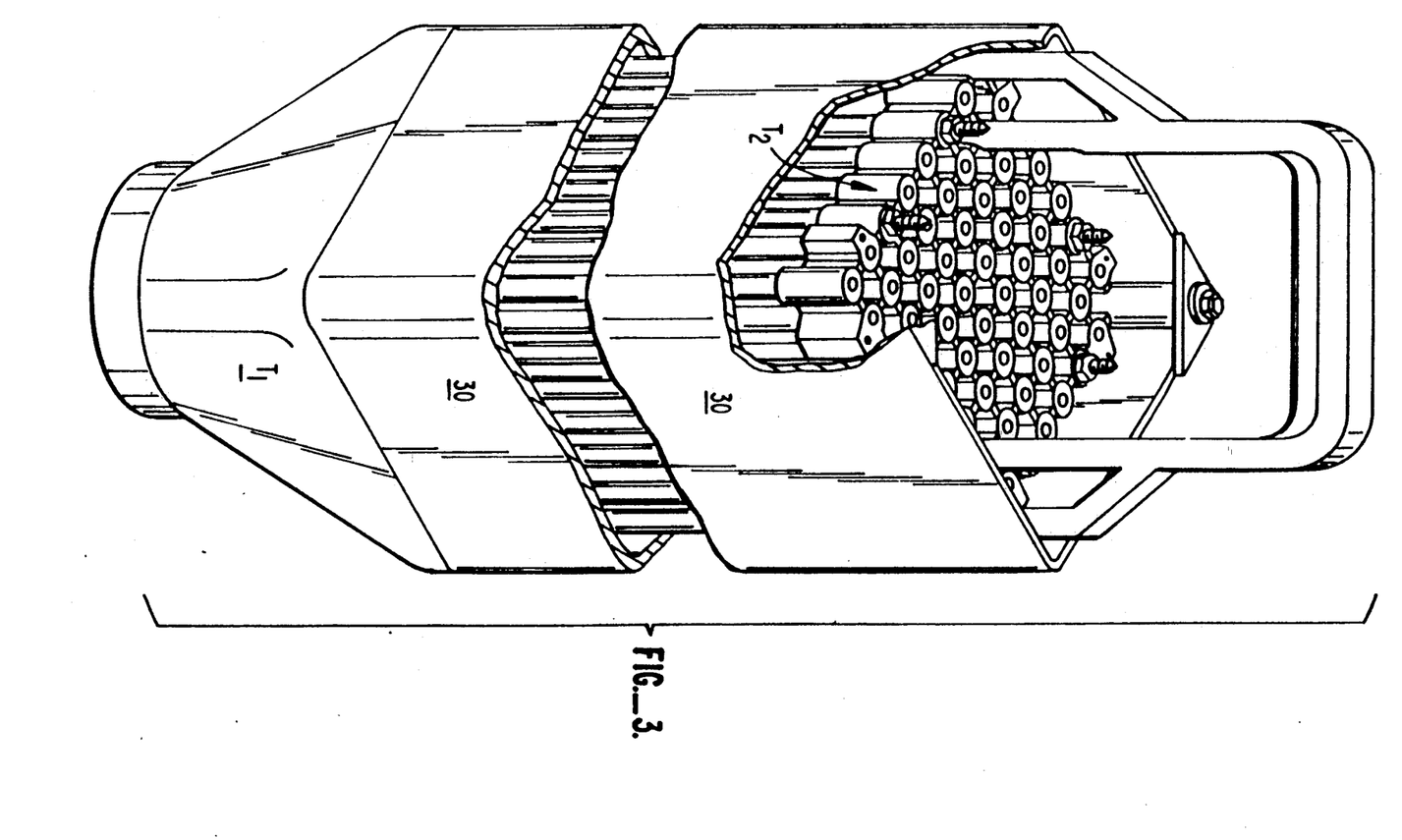
FIG. 3 is a view of a fuel bundle with the center section cut away, this fuel bundle showing the lower tie plate for receiving water to pass through the fuel bundle, the upper tie plate for permitting the steam and water mixture to pass out of the bundle with an overlying handle for the removal and insertion of the bundle.

Each fuel bundle includes a lower tie plate T1 (see FIG. 3). At the upper end, each fuel bundle includes an upper tie plate T2. Extending between the tie plates there is defined a channel 30. It is the function of the channel 30 to confine fluid flow between the tie plates and within the channel so that water moderator can form two discrete functions.

First, the water moderator takes the fast high energy neutrons emitted in the fission reaction and causes the neutron to become slow or thermal neutrons. It is the slow or thermal neutrons which cause the continuing nuclear reaction to occur.

Second, the upwardly flowing water is turned in part to steam. This steam is used to extract work from the heat of the nuclear reaction by conventional turbine condensers and recycling to the nuclear reactor shown in FIG. 1.

Referring further to FIG. 2, a control rod 40 is illustrated. The control rod 40 passes between four fuel bundles. These fuel bundles being denominated 31, 32, 33 and 34. Some attention can now be given to the disposition of the fuel bundles.

Typically, and at their lower end, the fuel bundles are each supported on a fuel support casting 50. Fuel support casting 50 extends downwardly into and through holes 26 in the top guide 24. Fuel support casting finds support on the top of the control rod drive housing (not designated). The control rod drive housing in turns passes the weight of the fuel bundles to the bottom of the reactor vessel V (see FIG. 1).

The discrete fuel bundles 31-34 are supported at their upper end at a top guide G. Top guide G includes a metallic lattice including cross members 61, 62, 63, and 64. These respective cross members support the fuel bundles 31-34 in vertical upstanding relation.

The fuel bundles are spaced apart. This spacing apart forms a cruciform sectioned interstices 70 illustrated between the discrete fuel bundles. This cruciform sectioned interstices 70 has control rod 40 shown placed therein.

Control rod 40 is conventional. It typically is inserted through an aperture 26 in core plate 24 from a position of residence in the control rod drive housing (not shown). In controlling the nuclear reactor, the control rod passes upwardly between the respective fuel bundles. Its cruciform section includes a number of flat planar surfaces, 41, 42, 43 and 44.

It can be seen that flat planar surface 41 passes in the interstitial area between fuel bundles 33, 34. Planar surface 42 passes between bundles 31, 34. Planar surface 44 passes between bundles 31, 32 and finally planar surfaces 43 passes between bundles 33 and 32.

Typically there is only provided one control rod for each group of four fuel bundles. It will further be understood that two flow paths for water are generically present. A first flow path for water is within the channels of the fuel bundles between the tie plates T1 and T2. A second flow path for water is in the so-called core bypass region. This is the region between adjacent fuel bundles.

During normal operation of the reactor, the flow path between the tie plates and within the fuel bundle contains steam. This steam is present in higher fractions as the water rises from the bottom of the fuel bundle to the top of the fuel bundle.

During start up operation of the reactor, the flow path between the tie plates and within the fuel bundle contains water. This water causes higher neutron moderation. This high neutron moderation requires the establishment of the cold reactivity shut down zone.

During all normal operations the core by-pass region is flooded with water. This core by-pass region exerts on those fuel rods adjacent to it a high degree of neutron moderation. Accordingly, higher levels of thermal neutron flux are present in this region.

Figure 4A:
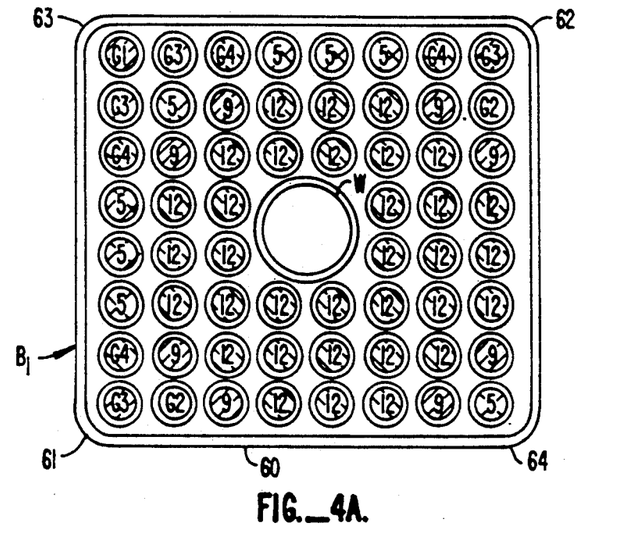
FIG. 4A is a plan view of a fuel bundle having burnable absorber gadolinium rods faced to the corners of the fuel bundle.

Referring to FIG. 4A a fuel bundle, B1 of the type herein used is illustrated. General observations can be made.

First, the bundle includes a rectangular section channel 60 and a central water rod W. Water rod W and the exterior of channel 60 commonly contain water without steam intermixed. Accordingly, these areas of the fuel bundle produce relatively high levels of moderation.

Secondly, it can be seen that the respective corners of the fuel bundle 61, 62 and 63 are the locations for the gadolinium containing rods having the burnable absorber gadolinium. Corner 64 is typically adjacent instrument tubing such as that tubing utilized for local power range monitors. Since gadolinium will have an adverse effect on the neutron flux, a quantity measured by the instrument tubing, it is omitted from the bundle corner 64.

Typically, the control rod 40 illustrated in FIG. 2 passes with its cruciform shaped intersection adjacent corner 63 of bundle B1. The reader will realize that in the normal operating state of the reactor, the control rod is typically fully withdrawn.

As will hereinafter be set forth, the particular design herein disclosed is utilized with a so-called D lattice nuclear reactor. In such a D lattice nuclear reactor, the fuel bundle spacing varies. Typically, and at corner 64, the fuel bundles are relatively closely spaced. Opposite corner 64 and at corner 63, the fuel bundles defined their widest separation. It is into the interstices between the fuel bundle at corner 63 that the control rod 40 shown in FIG. 2 passes.

At corner 61, 62 spacing of the fuel bundles apart from one another is intermediate those spacing encountered at corners 63, 64.

Remembering that the control rod 40 is normally fully withdrawn, and remembering that the spacial gap adjacent corner 63 is the largest, it can be seen that five rods containing gadolinium and labelled G1 and G3 and G4 are located adjacent corner 63.

As distinguished from corner 63, corner 62, 61 includes only three gadolinium rods. These rods being labelled G2, G3 and G4.

Finally, corner 64 is without gadolinium.

It will further be observed that water rod W occupies approximately 4 lattice position in the 8×8 lattice. Accordingly, 49 of the remaining rods have combinations of plutonium mixed with the depleted uranium.

Figure 4B:
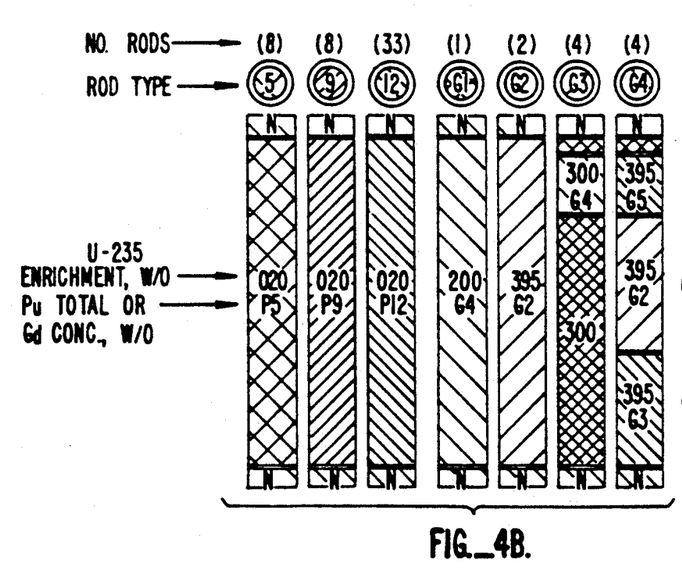
FIG. 4B are vertical axial profiles of the variant rods designated in FIG. 4A.

Referring to FIG. 4B, the concentrations of plutonium can readily be understood. Fuel rods 5 include plutonium at the level of 5 weight percent.

Fuel rods 9 include plutonium at the level of 9 weight percent. Finally, fuel rods 12 include plutonium at 12 weight percent.

It will further be seen that 33 of the disclosed rods have plutonium at the level 12 weight percent. It can be seen that at this level, the disclosed bundle design has a relatively high concentration of plutonium.

Further, all of the so-called MOx bundle of fuel rods (that is rods 5, 9 and 12) have a depleted uranium enrichment. Specifically, these rods include two-tenths of a weight percent of uranium -235. Preferably, the material is taken from any source of depleted uranium such as enrichment plant tails and the like. It can further be seen that gadolinium is contained in four rod types. In two of these rod types, G1 and G2, the gadolinium is evenly distributed throughout the rod length. This being the case, these particular rods do not contribute significantly to the formation of the cold reactivity shutdown zone.

Referring to rods G3 and G4, it can be seen that gadolinium in high weight percents (four weight percent in rod G3 and five weight percent in rod G5) is distributed with large percentiles being within the so-called cold reactivity shutdown zone.

The enrichment levels of rod G1 is approximately two weight percent. The enrichment level of rod G2 is 3.95 weight percent. Finally, rod G3 includes 3 weight percent uranium with rod G4 including 3.95 percent uranium -235.

Small vertical sections of natural uranium are distributed in the bottom and top 6" of the fuel rods.

Figure 4C:
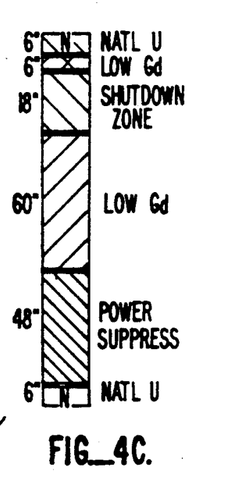
FIG. 4C is a bundle average vertical axial profile of the bundle of FIG. 4A.

Referring to FIG. 4C, a bundle average vertical axial profile is set forth. In the vertical axial profile, the shutdown zone of the disclosed bundle is illustrated. The reader will remember that this shutdown zone is imparted solely by the gadolinium rods G3 and G4.

Further, the reader will understand that the varying concentrations of plutonium are held to a mere 3 concentrations. Furthermore, the heaviest concentration of plutonium predominates the bundle.

It will be understood that practical manufacturing dictates that the gadolinium rods usually be fabricated in a facility separate and apart from those rods including large amounts of plutonium. It can be seen that the disclosed invention only includes 11 gadolinium rods and that these gadolinium rods can be conveniently assembled elsewhere and shipped in the site of fuel bundle assembly.

We have here shown in the preferred embodiment a fuel bundle whose initial reactivity profile has been tailored to define a so-called "cold reactivity shut down zone". The reader will appreciate that this is the preferred embodiment. It will be understood that this invention may be practiced on a less than preferred basis by the location of gadolinium rods at the corner locations without tailoring of the cold reactivity profile to create the "cold reactivity shut down zones".

Having set forth, the physical construction of a fuel bundle, two graphic illustrations can further show the advantage of this fuel design.

Figure 5A:
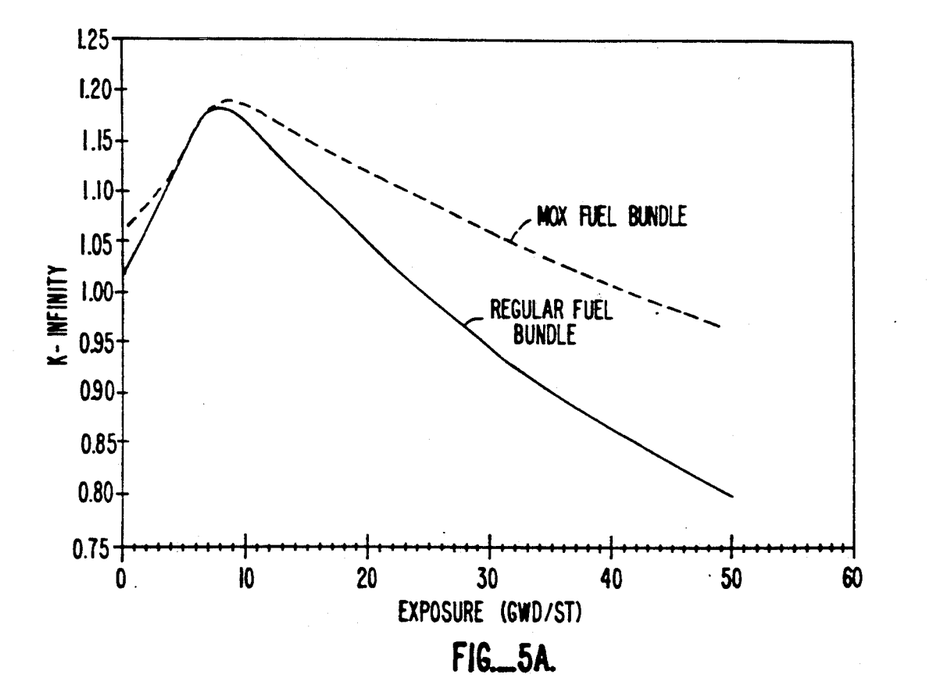
FIG. 5A is a plot of the reactivity for an infinitely large core against gigawatt days per short ton, the plot here comparing the performance of fuel of the disclosed design with prior art fuel loading.

Referring to FIG. 5A, it can be seen that the plot of an ordinary fuel bundle against the improved bundle of this disclosure illustrates improved reactivity. Specifically by plotting infinite reactivity against exposure in gigawatt days per short ton it can be seen that virtually at all times during the life of the fuel bundle that the reactivity remains higher. Specifically, and remembering that the bundles of this design will be distributed throughout the core, it can be seen that the improved reactivity will be imparted to the remainder of the core. This being the case, less enrichment over all of the core will be required.

Figure 5B:
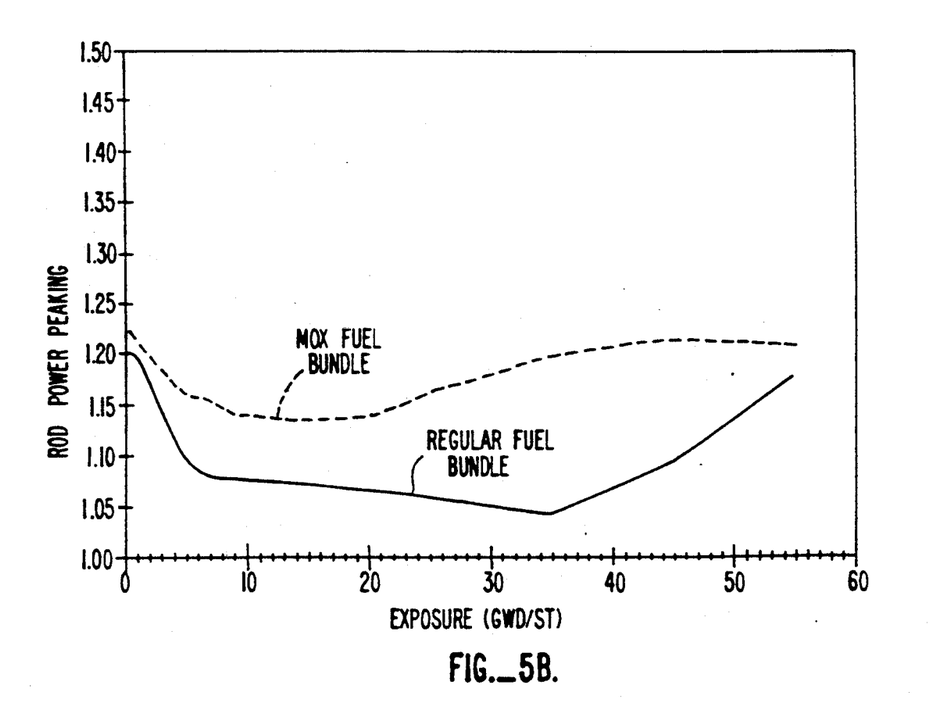
FIG. 5B is a plot of rod power peaking versus gigawatt days per short ton, the plot here comparing local peaking versus exposure over the life of the fuel bundle.

Referring to FIG. 5B, the reader will understand that the physics of the plutonium combinations herein utilized will inevitably cause higher peaking. Peaking is that phenomena of local heating which local heating limits the overall power of a fuel bundle to avoid local damage to any part of a nuclear fuel rod within the fuel bundle.

It has been found however, that the peaking with exposure although higher does not significantly exceed the peaking at the beginning and end of a typical fuel bundle cycle. This being the case, an acceptable compromise of this parameter occurs.

Figure 6A:
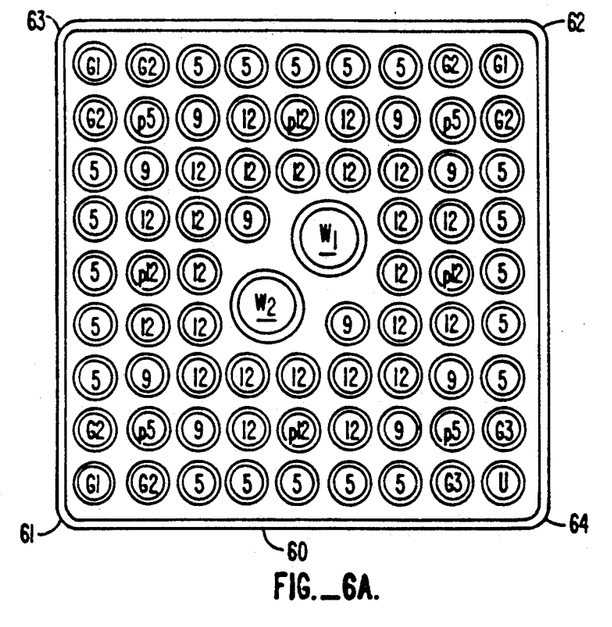
FIG. 6A is a 9×9 rod array utilizing partial length rods incorporating the fuel design of this invention.
Figure 6B:
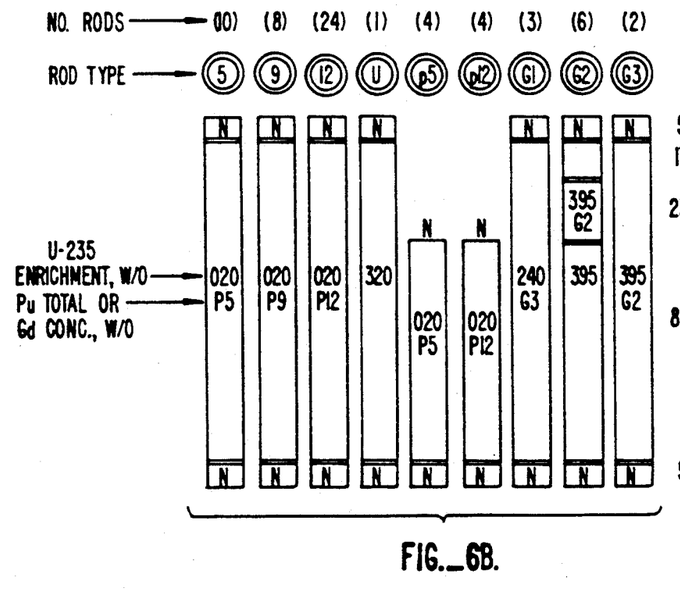
FIG. 6B is a vertical profile of the various rods used in the fuel bundle of FIG. 6A; and, FIG. 6C is a bundle average vertical profile of the bundle of FIG. 6A.
Figure 6C:
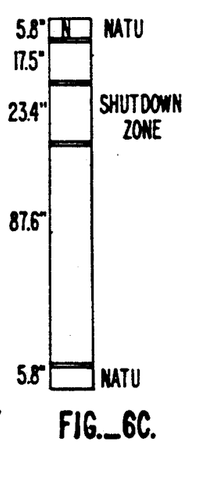

Having set forth the construction of a fuel bundle on an 8×8 array, referring to FIG. 6A, 6B and 6C, the construction of a fuel bundle on a 9×9 array is illustrated. Referring to FIG. 6A, a fuel bundle B2 including first and second water rods, W1 and W2 is illustrated. These respective water rods displace seven lattice positions leaving 84 positions to be filled.

So-called partial length rods are utilized in this invention. Specifically, these partial length rods denominated P5 and P12 extend ⅔ the full height of the fuel bundle. That is to say assuming that the fuel rods include 11' 8" of nuclear fuel, partial length rods extend 8'6" from the bottom of the fuel rod to and towards the top. These partial length rods include respectively 5% plutonium for rods P5 and 12% plutonium for rods P12. Both include a mixture of uranium 235 in the range of 0.2 weight percent.

It can also be seen that each of the partial length rods is located in the second row removed from the channel wall of the bundle B2 has been found that such a location of the partial length rods imparts maximum advantage to the design herein disclosed.

The cold reactivity shutdown zone (see FIG. 6C) is imparted solely by the axial distribution of rods G3 and the 3 weight percent of gadolinium there specified. Specifically, such rods have a uniform 3% uranium enrichment. Within the shutdown zone, (see FIG. 6C) gadolinium in the amount of 3 weight percent is utilized. It can be seen that there is one rod G3 in the respective fuel bundle corners 61, 62 and 63.

A weighted gadolinium rod has been eliminated from fuel bundle corner 64. This is because fuel bundle corner 64 is typically immediately adjacent instrumentation such as the local power range monitor.

Adjacent the corners, there can be seen a second gadolinium rod G2. Gadolinium rod G2 has two weight percent gadolinium distributed only to the shut down zone.

Finally, and again near the corners a uranium rod U1 without any plutonium intermixed is specified. These uranium rods are again adjacent the corner lattice position.

It thus can be seen that the disclosed fuel design includes only three classes of gadolinium rods and one conventional uranium rod containing 3.6 weight percent uranium.

The remaining rods all contain plutonium. Specifically, rod P5 includes 5.0 weight percent plutonium. Rod P9 contains 9.0 weight percent plutonium, rod P12 includes 12 weight percent plutonium. These respective weight percents of plutonium are intermixed with depleted uranium sources on the order of 2/10ths of a percent.

Referring to FIG. 6C, the bundle average vertical profile of the fuel bundle can be seen. In the case of the preferred embodiment here illustrated, gadolinium has been tailored in its vertical profile to create the so-called "cold reactivity shut down zones". As hereinbefore set forth, embodiments without these cold reactivity shut down zones, while not preferred, are within the scope of this invention.

In the following claims, the term "adjacent the corners" will be used. The reader will understand by using this term we intend to include the corner location, the two rods adjacent the corner, these latter two rods being adjacent the channel. Thus, this definition can include twelve lattice positions within a fuel bundle.

What is claimed is:

1. In a boiling water reactor core having a plurality of vertically upstanding fuel bundles; each fuel bundle containing longitudinally extending sealed rods with fissile material therein;
   a surrounding channel for containing water flow within each said fuel bundle from water exterior of said fuel bundle; water moderator flowing in the confining channel from the bottom of said fuel bundle to the top of said fuel bundle for producing steam and moderating neutrons to a thermal energy state for producing continuing nuclear reaction in said fissile material;
   said water moderator exterior of said confining channels for defining a core bypass zone having relatively high concentrations of water for moderation of neutrons from high energy state neutrons to a thermal energy state for the continuation of said nuclear reaction;
   a plurality of said fuel rods including a component of fissile material including recovered plutonium and uranium distributed over an axial extent of said fuel assembly;
   at least some of said fuel rods containing a component of neutron absorbing material for controlling excess reactivity imparted by said recovered plutonium;
   the improvement in said distribution of fissile material and neutron absorbing material comprising:
   said fissile material including a mixture of uranium and recovered plutonium in rods of said fuel bundle at locations other than the corners of said fuel bundle; and,
   neutron absorbing material being located in rods of said fuel bundle at rod locations adjacent the corners of said fuel bundles whereby said neutron absorbing material has decreased shielding from said plutonium and maximum exposure to thermal neutrons for shaping said cold reactivity shutdown zone in said fuel bundle.

2. The invention of claim 1 and wherein said rods containing said neutron absorbing material do not contain fissile material including a mixture of uranium and recovered plutonium.

3. The invention of claim 1 and wherein said rods at the corners of said fuel bundle having a weighted axial distribution to define exclusively a "cold shutdown reactivity zone" of said fuel bundle.

4. The invention of claim 1 and wherein said fuel rods containing a component of fissile material including recovered plutonium and uranium include partial length rods.

5. In a boiling water reactor having a plurality of vertically upstanding fuel bundles; each fuel bundle containing longitudinally extending sealed rods with fissile material therein; a surrounding channel for containing water flow within each said fuel bundle from water exterior of said fuel bundle; water moderator flowing in the confined channel in the bottom of said fuel bundle to the top of said fuel bundle for producing steam and moderating neutrons to a thermal energy state for producing continuing nuclear reaction in said fissile material; said water moderator exterior of said confining channels for defining a core by-pass zone having relatively high concentration of water for moderation of neutrons from a high energy state to a thermal energy state for the continuation of said nuclear reaction; each rod including a component of fissile material distributed over an axial length of said fuel assembly;

at least some of said fuel rods containing a component of neutron absorbing material for controlling excess reactivity imparted by said recovered plutonium; the improvement in the distribution of fissile material and neutron absorbing material comprising;

said fissile material including a mixture of uranium and recovered plutonium in rods of said fuel bundle at locations other than the corners of said fuel bundle; and, said neutron absorbing material being located in rods of said fuel bundle at rod locations in the corners of said fuel bundle; said neutron absorbing material having an axial distribution characterized by an enhancement in the axial zone of said fuel assembly, designated the cold shutdown zone, corresponding to at least a portion of the axial region of said core where the cold reactivity peaks, the aggregate amount of neutron absorbing material in said cold shutdown zone of said fuel assembly being greater than the aggregate amount of neutron absorbing material immediately above and below said cold shutdown zone whereby the cold shutdown reactivity is reduced relative to the cold shutdown reactivity in zones immediately above and below said cold shutdown control zone, said cold shutdown control zone having an axial extent measured from the bottom of the fuel assembly in the range between 60% and 90% of the height of said fissile material in said fuel assembly.

6. The invention of claim 5 and wherein said fuel bundle includes an 8×8 array of fuel rods.

7. The invention of claim 5 and wherein said fuel bundle includes a 9×9 array of fuel rods.

8. The invention of claim 5 and wherein at least some of the rods at locations other than the corner of said fuel bundle are partial length rods.

9. The invention of claim 5 and including a fuel bundle having one corner rod placed in said bundle without neutron absorbing material being disposed in said corner rod.

* * * * *